United States Patent
Stehning

[15] 3,678,984
[45] July 25, 1972

[54] REACTION VESSEL FOR CHEMICAL AND PHYSICAL REACTIONS OF VISCOUS MASSES

[72] Inventor: Paul Rolf Stehning, Thuringerstrabe 2, 6391 Gravenwiesbach, Germany

[22] Filed: Nov. 16, 1970
[21] Appl. No.: 89,810

[52] U.S. Cl. ........................... 159/25 A, 259/8, 260/75 M
[51] Int. Cl. ................. B01d 1/00, B01f 7/16, B01d 9/00, B01f 15/00, C10b 7/00, C08g 17/00
[58] Field of Search ......... 159/25, 45, DIG. 10, 4 C, DIG. 14, 159/47; 23/273, 306; 127/15, 16; 99/246; 107/30; 259/6, 7, 8, 107, 108; 264/68, 349; 260/75 M; 202/103; 252/60, 165

[56] References Cited

UNITED STATES PATENTS

| 340,772 | 4/1886 | Eckstein, Jr. | 259/7 |
| 2,122,287 | 6/1938 | Kepper | 259/8 |
| 2,267,041 | 12/1941 | Patterson | 263/26 X |
| 2,517,149 | 8/1950 | Walsh et al. | 259/108 X |
| 2,606,820 | 8/1952 | Harms | 23/273 |
| 3,006,474 | 10/1961 | Fitch | 259/7 X |

FOREIGN PATENTS OR APPLICATIONS

| 8,635 | 1913 | Great Britain | 263/26 |
| 310,701 | 5/1929 | Great Britain | 259/107 |

Primary Examiner—Wilbur L. Bascomb, Jr.
Assistant Examiner—J. Sofer
Attorney—Waters, Roditi, Schwartz & Nissen

[57] ABSTRACT

A reaction vessel comprises an annular, vertical container with a frusto-conical base through which mass to be treated is passed radially outwards a rotatable stirring mechanism. The stirring mechanism is composed of a vertical shaft with radial arms from which stirring blades depend into close proximity with the base of the container. The stirring blades are spaced along the arms, and annular dividing walls attached to the base extend into the spaces between the arms, the dividing walls having openings at the bottom thereof for outward flow of mass. The container has an outer ring with an overflow wall in front thereof and a discharge opening is provided in the bottom of the ring. The arms carry a scraper which travels in the ring.

13 Claims, 8 Drawing Figures

REACTION VESSEL FOR CHEMICAL AND PHYSICAL REACTIONS OF VISCOUS MASSES

BACKGROUND OF THE INVENTION

1. Field of the Invention

The invention relates to a reaction vessel for the chemical and physical reactions of highly viscous masses, such as evaporating, mixing, heating, or cooling such masses, particularly those which condense during the evaporation under a vacuum. The invention relates further to reaction equipment where a plurality of reaction vessels of the above type are used.

2. Description of the Prior Art

A reaction vessel is known which has the form of a vertical container of annular or circular cross-section having a substantially frusto-conical downwardly tapering base, said container being provided with a driven stirring mechanism having a vertical shaft and comprising substantially radially extending stirring arms with substantially axially extending stirring blades attached thereto, which are submerged below the level of the highly viscous substance continuously supplied into the reaction vessel. The level of liquid is continuously and automatically adjusted to a predetermined position at least at the input of the reaction vessel.

The above reaction vessels are used for evaporation of condensing and polymerizing resins, particularly polyamides and polyesters, and in the known constructions the stirring mechanism is mounted in a liquid containing chamber of the container, said vertical shaft of the stirring mechanism being arranged at the central axis of the container and above the frusto-conical container base, the starting materials being introduced brought into the container from above and the product is discharged in a controlled amount through a central opening in the container base. The reaction vessel jacket, preferably a double wall jacket, and the reaction vessel base are heated during the operation and the resulting vapor is drawn off under a vacuum from the heated reaction vessel via a vapor chamber above the level of the liquid.

The invention primarily contemplates the above mentioned fields of use, however, the reaction vessel according to the invention may also be used for treatment of these and other highly viscous masses with a viscosity up to 18,000 poise in order to evaporate, mix, heat or cool these masses, wherein the reaction vessel jacket and/or base are contacted with a heating medium for the purpose of evaporation or with a cooling medium for the purpose of cooling. When used as a mixer, solid or liquid substances may be admixed in the highly viscous mass in the reaction vessel, for instance, a polyester mass can be mixed with glass fibers. Also, for instance, tar materials can be treated and/or evaporated in the reaction vessel together with binders in order to obtain a product usable for street or highway construction.

The above mentioned known reaction vessel is disadvantageous in that the continuous throughput of the mass is insignificant in comparison with the capacity of the container, because the evaporation which takes place from the surface of the mass is only slightly promoted by the stirring mechanism and, in many cases, only a partially incompletely evaporated material leaves the container through the opening in the bottom, the duration of its residence in the container being too short. For masses whose viscosity sharply rises during the evaporation, such as particularly for polyesters, the evaporation time spent in the known reaction vessel is insufficient for production of the end product, and thus the evaporation must be continued by complicated devices in one or more following reaction vessels arranged at the output of the first reaction vessel. In one such additional reaction vessel, use is made of discs which rotate about a horizontal axis in a horizontal cylindrical container, an upper part of these discs being contained in the vapor chamber of the reaction vessel and the lower part being immersed in the composition under treatment, the discs serving to drag the material up to the surface.

The passage of the composition through a reaction vessel of this kind is not forced so that the period during which it remains therein is not uniform, and the construction is more complicated and costlier than in the case of the preceding reaction vessel of the first stage. In the case of compositions, such as polyesters, which become more viscous as a result of the evaporation, a reaction vessel of said known kind must be followed by a final stage involving further treatment in a reaction vessel in which two meshing screw elements rotate in a horizontal retainer and break up the viscous composition during evaporation. With this reaction vessel too, the construction is complicated and costly in relation to the quantity of material passed through during a given unit of time.

SUMMARY OF THE INVENTION

An object of the invention is to provide a construction of reaction vessel of the initially stated type in which the quantity of material passed through during a given unit of time when using reaction vessels of considerably smaller volume is equal to or greater than that previously achieved and/or the treatment time required for obtaining the same quantity of the end product is shortened. These advantages are great, particularly in the case of polyamides and of polyesters as well.

Another object of the invention is to achieve a corresponding reduction in the cost of construction of the reaction vessel and to prevent composition from depositing upon the walls, dead spaces or the surfaces of the elements of the stirring mechanism, and to prevent such material from cross-linking at these places and interfering with the subsequent processing operation.

In these cases where, because of the high viscosity of the treated composition, which increases during evaporation, the practice has been (particularly when handling polyesters) to operate in several stages with a plurality of reaction vessels arranged in series and of costly and hitherto differing construction, a purpose of the invention is to provide reaction equipment in which the construction of the first-stage reaction vessel of the invention can also be used in the subsequent stages in a reaction installation in order to achieve further reduction in the cost of the construction.

By means of tests an investigation was carried out to ascertain whether, for the purposes of the invention, i.e., for evaporating monomers or oligomers, use could be made of thin-layer evaporators, which are known for other evaporation purposes and with which thin layers, 0.5 to 1 mm in thickness, are produced on the inner wall of the vertical body of an externally heated evaporator and are stripped off after the evaporation operation. Products from condensible and polymerizable starting materials that can be used for synthetic resins cannot however be obtained in this way, since the layer adhering to the inner walls of the evaporator leads to harmful cross-linking or decomposition.

According to the invention, the stirring arms and the stirring blades attached thereto and depending vertically therefrom are almost entirely located in the production chamber defined in the frusto-conical base of the reaction vessel and the stirring blades extend from the vicinity of the level of the liquid in proximity to the frusto-conical base of the reaction vessel. The blades are spaced along in their radial planes to define spaced between the blades of the same arm extending over the entire axial depth of the blades. Upstanding ring-shaped dividing walls are fixed to the base and extend concentrically in the reaction vessel to pass through the radial chambers spaces between the spaced blades. The dividing walls are provided with openings which serve as restriction means for the mass flowing radially through the openings, under centrifugal force. The base of the container is provided with an outer bottom ring in the vicinity of the upper edge of the production chamber, with at least one bottom opening to which a discharge worm conveyor is attached, the stirring arms including scrapers extending in to the bottom ring. A further ring-shaped dividing wall is provided between the scrapers and the outermost stirring blade, said further dividing wall being concentric with the other dividing walls and rigidly attached to the base of the reaction vessel to serve as an overflow for the discharged mass, which is supplied near or in the center of the production chamber.

The overflow ring may be provided with openings as are the other dividing walls, but preferably it has no openings and serves as an overflow barrier for the discharged mass.

As the stirring arms and stirring blades move practically the entire mass in the production chamber defined by the frusto-conical base, the heat transfer from the jacket of the reaction vessel into the mass and the evaporation are significantly promoted by the fact that the stirring blades extend in immediate proximity to the frusto-conical base, so that despite the relatively small height and relatively small diameter of the surface of the mass, (which surface may be positioned only a few millimeters above the arms) there is obtained a large throughput per time unit according to the size of the reaction vessel, e.g., 0.5 to 24 tons per day, and a uniform and sufficient spectrum of residence time, which effect is increased also by the dividing walls.

Simultaneously, the stirring mechanism continuously drives the evaporated mass through the dividing walls by the centrifugal effect and then over the overflow wall to the outer bottom ring and to the discharge worm conveyor, without the product being deposited on the surfaces of the stirring arms, stirring blades and outer bottom ring, the latter being kept free from deposits by the scraper rotating together with the stirring arms. The conveying of the product from the production chamber to the outer bottom ring depends on the speed of rotation of the stirring arms, the diameter covered by these arms, the cone angle of the base of the reaction vessel, the number and position of the stirring arms, the size of the openings in the dividing walls and on the instantaneous viscosity of the stirred mass. According to the invention, the cone angle of the base of the reaction vessel is larger, the higher the viscosity of the mass, and, in general, for masses with viscosity to 300 poise the angle is not greater than 90°. For masses with higher viscosity the angle becomes increasingly obtuse in this manner, the desired advantageous residence time of the mass in the reaction vessel may be obtained and kept uniform in the entire vessel by the effect of the cone angle of the frusto-conical base, the outer bottom ring and the discharging worm conveyor as well as the corresponding control of the rotation speed of the worm conveyor for the supply of the mass and the regulation of the speed of rotation of the stirring mechanism.

The input of the mass may of course be changeably adjusted in a known manner or, in a similar manner as the output speed, simultaneously and automatically controlled by a sensing device for the position of the level of the mass.

To improve their action, the scrapers which are coplanar with the blades are preferably formed with inverted V-shaped upper edges. The scrapers include depending portions extending rearwardly with respect to the direction of rotation, and, at least over the greater part of the cross-section of the bottom ring, they extend close to the bottom of said bottom ring.

When the invention is applied to reaction equipment for the multi-stage evaporation of composition, e.g., polyesters which thereby increase in viscosity, it is intended that reaction vessels in accordance with the invention and of the same construction, as described should be used in all stages, the vessels being disposed one beyond the other. Advantageously the cone angle of the bases of the vessels will successively increase from one stage to the next. This results in a further saving in the cost of the construction, and a uniform or continuous large throughput can be achieved in all stages irrespective of the increasing viscosity, i.e., the product from one stage can be introduced into the reaction vessel of the next stage without its having to be stored. In this arrangement of course, the dimensions and rates of speed of the parts of the reaction vessel of the invention as described above are in each stage adapted to suit the varying viscosities, specific weights and throughput quantities of the composition that occur at each such stage.

BRIEF DESCRIPTION OF THE DRAWING:

In the embodiments shown in FIGS. 1, 6 and 7, the same references numerals are used for the same or corresponding parts.

DETAILED DESCRIPTION

Figure 1:
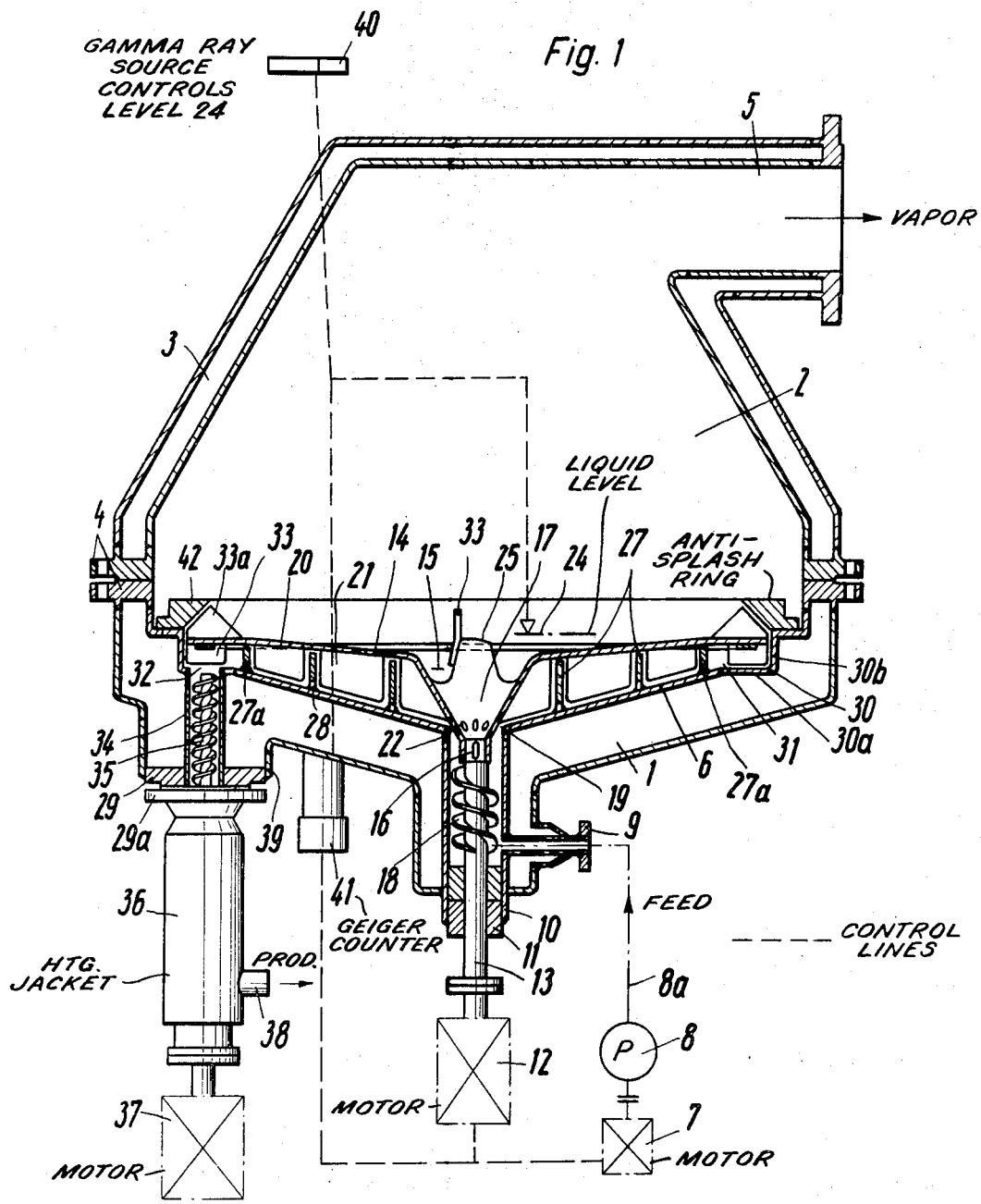
FIG. 1 is a vertical section through a reaction vessel for the treatment of compositions of high viscosity.
Figure 2:
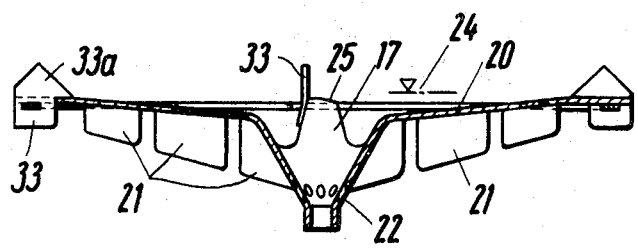
FIG. 2 is a vertical section through a stirring mechanism for the reaction vessel shown in FIG. 1.
Figure 3:
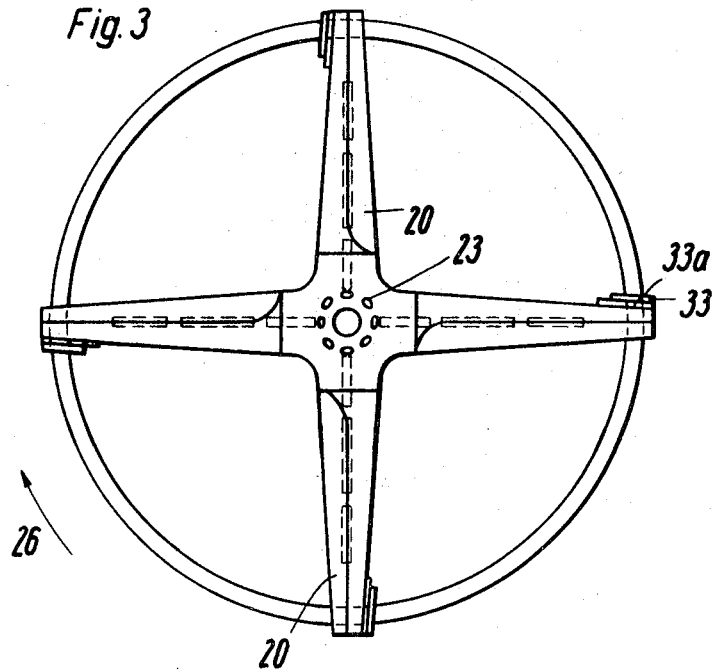
FIG. 3 is a plan view of the stirring mechanism of FIG. 2.
Figure 4:
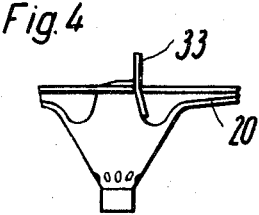
FIG. 4 is a rear view of the stirring mechanism of FIG. 2, the radially outer portions being shown broken away.
Figure 5:
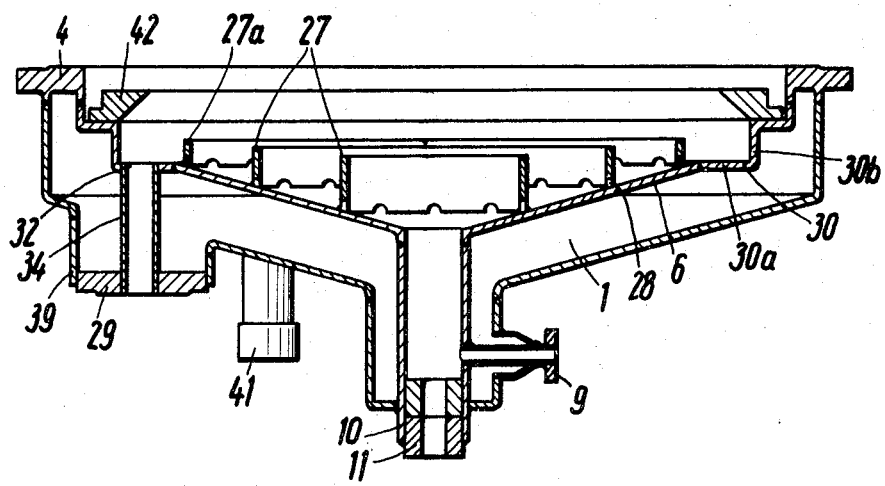
FIG. 5 is a vertical section through the production chamber of the reaction vessel of FIG. 1, the stirring mechanism being omitted.
Figure 5A:
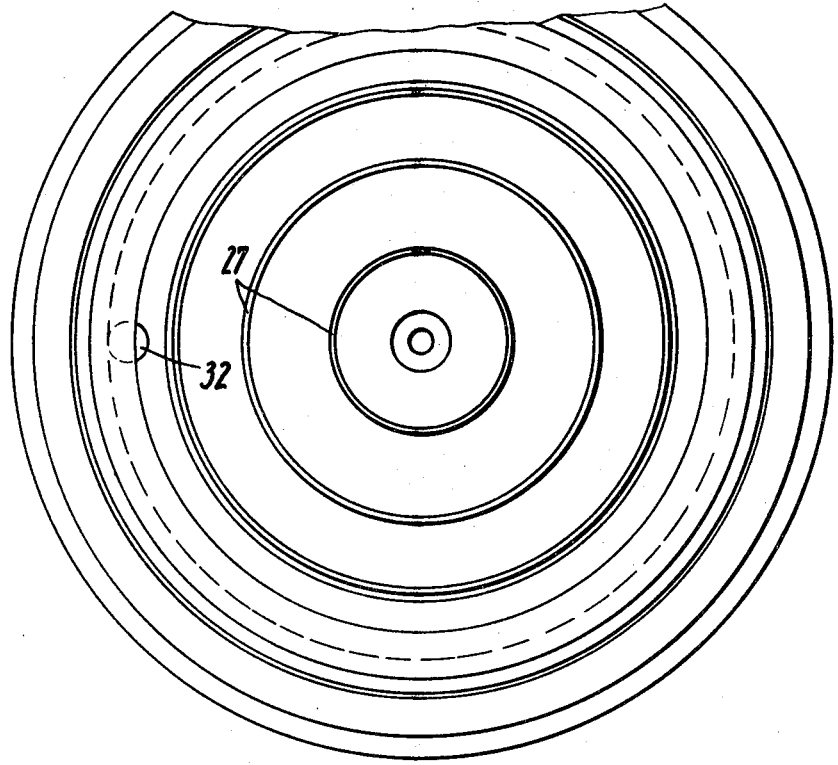
FIG. 5a is a plan view of the chamber of FIG. 5.

Referring to FIGS. 1 to 5, the reaction vessel consists of two main parts, a lower part 1, comprising a production chamber and a sump for liquid, and an upper part 2, incorporating a vapor chamber. Both parts of the reaction vessel have a double wall 3 for the circulation of a heating fluid of steam and inlet and outlet ports which are not shown. The parts of the reaction vessel are interconnected by means of flanges 4 to provide a liquid-tight and vacuum-tight seal.

The upper part of the reaction vessel has a vapor outlet port 5, to which is connected a vacuum source (not illustrated) for drawing off the vapor from the composition to be treated in the reaction vessel during evaporation.

A main portion of the reaction-vessel base 6, constituting the production chamber, is of frusto-conical formation. In the embodiment shown in FIGS. 1 and 5 the angle of taper of the base of the reaction vessel is very obtuse and is intended for the treatment of compositions having viscosities of 1,000 to 5,000 poise.

Figure 6:
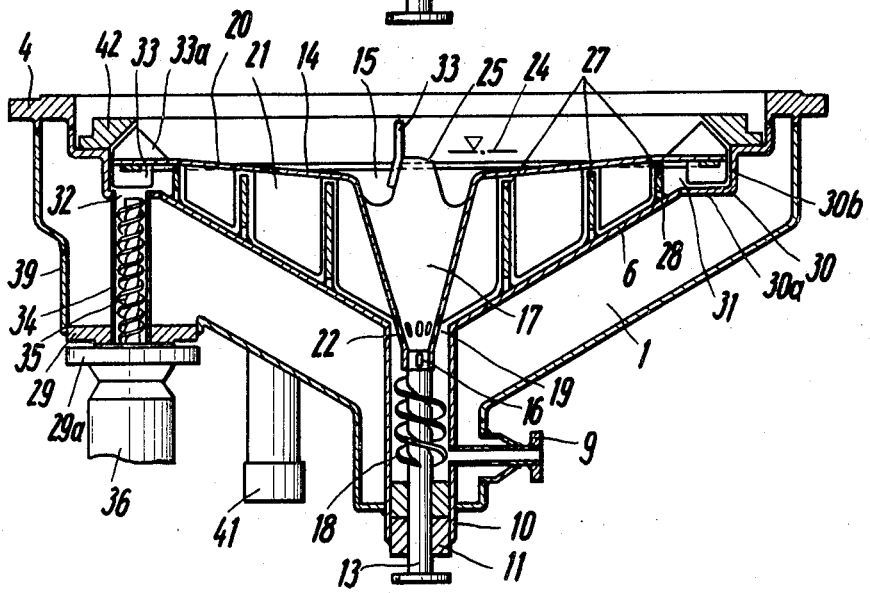
FIg. 6 is a vertical section through the lower part of a reaction vessel similar to that of FIG. 1, but in which the frusto-conical portion of the base of the vessel has a sharper angle of taper than in FIG. 1, and the production chamber, disposed above said base, is intended for operating with compositions of lower viscosity than is the reaction vessel of FIG. 1, certain parts being omitted.

In the embodiment shown in FIG. 6, which is intended for handling compositions having a viscosity of 300 to 1,000 poise, the angle of taper of the base 6 of the reaction vessel is obtuse but less than in the case of the vessel shown in FIG. 1. In the embodiment illustrated in FIG. 7, which is intended for use with compositions having viscosities of up to 300 poise, the angle of taper of the base 6 of the reaction vessel is acute and is somewhat less than 90°.

The composition to be treated is fed by means of a pump 8, powered by a motor 7, through an inlet port 9 into a charging pipe 10, the upper end of which terminates at the center of the base of the reaction vessel. The lower end of the pipe 10 is closed by means of a vacuum gland 11 and constitutes the hearing for a drive shaft 13, powered by a motor 12, which shaft drives the stirring mechanism 14, which is accommodated in the production chamber 15. Between the lower end 16 of the hub 17 of the stirring mechanism and the gland 11, the drive shaft 13 in the pipe 10 can take the form of a conveyor screw 18 for continuously passing the composition into the reaction vessel, when the composition is of high viscosity and the delivery capacity of the pump 8 is not adequate. The moving material passes upwardly through a central hole in the base 6 and through an open annular passage 19 surrounding the hollow hub 17, the material also flows in the stirring mechanism 14 through openings 22 at the lower end of the hub 17.

The stirring mechanism comprises a plurality of arms 20, for example four arms (see FIGS. 2 and 3), which extend radially outwards from the conical hub 17, and blades 21 which are secured to the undersides of the arms. The hollow hub 17 contains openings 22 for the composition fed to it. The flow of the composition is set and automatically regulated, according to its viscosity, by means of a restrictor or any other known setting and regulating device (not illustrated) in the feed pipe 8a between the pump 8 and the port 9, and by varying the rate of speed of the drive 7, so that the level 24 of the liquid is set, as shown by a broken line in FIG. 1, at a small distance, e.g., a few millimeters, above the upper sides of the arms 20 of the stirring mechanism.

The upper side of each arm 20 is chamfered at 25 in such manner that the leading face of chamfered portion 25 extends forwardly and downwardly in the direction of rotation 26. Its purpose is to break up the surface 24 of the liquids, in the manner of a knife, so as to improve evaporation.

The blades 21 extend from the arms of the mechanism to a point close to the upper surface the base 6 of the reaction vessel and taper radially to match the angle of taper of said base. The blades are radially spaced from each other. Into these spaces there project annular separating walls 27 which are rigidly connected to the base 6 and contain openings 28 near the base. These separating walls serve the purpose of breaking the centrifugal action produced by the stirring mechanism 14 on the composition, insofar that they force the composition to flow through the narrow openings 28. An outermost wall 27a serves as an overflow for discharge of the composition.

Near its upper edge, the base of the reaction vessel is formed as an encircling outer base ring 30, which constitutes the outermost part 31 of the production chamber and the ring 30 has a substantially horizontal bottom portion 30a and a vertical wall portion 30b, which defines the production chamber and merges with the flange 4 of the lower part of the reaction vessel by means of angled portions.

In the annular bottom part 30a there is at least one discharge orifice 32 for the product. The sides of the outer ends of the arms 20 of the stirring mechanism carry scrapers 33 which occupy most of the outerpart 31 and sweep over the parts 30a and 30b of the base ring 30. As particularly shown in FIGS. 3 and 4, the parts of the scrapers 33 rotating in the part 31 slope downwardly from the arms towards their axis of rotation at an acute angle and rearwardly with respect to the direction of rotation 26, in order to improve the action of these scrapers in moving the material that is to be discharged.

Adjoining the discharge orifice 32 is a discharge pipe 34 in which rotates a discharge screw 35 which likewise directly adjoins the orifice 32. The discharge screw 35 and the discharge pipe 34 pass through a connecting portion 29 which, at a wall 39, provides a fluid-tight seal between the double wall of the reaction vessel and the pipe 34, said screw 35 and pipe 34 further extending through a heating jacket 36 which is joined to the connecting part 29 by means of a flange 29a. The inlet and outlet ports of the heating jacket 36 for the hot liquid or vapor are omitted from the drawing. The screw is driven by a motor 37, the housing of which is connected to the heating jacket which is closed at its upper and lower ends. The product discharged by the discharge screw passes through the heating jacket 36 and an outlet port 38, and is thence passed to a storage chamber or for further treatment, e.g., in a further reaction vessel of like construction.

If more than one discharge opening 32 is provided in the base ring 30, then a discharge screw 35, comprising the corresponding component parts 34, 29, 29a and 36 to 39, is fitted in each of these openings.

As can be seen, the stirring mechanism 14 imparts to the composition in the production chamber 15 a centrifugal acceleration whereby, during evaporation, the composition is passed from the central zone of the production chamber through the orifices 28 and, by way of the arms 20 of the stirring mechanism and the outer wall 27a into the outer part 31 of the production chamber. Here, the product that has been subjected to evaporation treatment, is seized by the scrapers 33 and continuously passed to the discharge screw or screws 35. These prevent deposits of the product from forming on the parts 30a and 30b of the base ring 30, and such deposits are also prevented in the frusto-conical part of the base 6 and on the separating walls 27 by the centrifugal flow of the composition and by the stirring action of the blades 21 and arms 20, upon which no material is deposited either.

During this process, the level 24 of the liquid is automatically held at the short distance of a few millimeters, above the arms of the stirring mechanism by means of a sensing device which may be of the optical type. In the embodiment illustrated, the sensing device consists of a gamma-ray source 40. The continuously produced gamma-rays penetrate the wall of the container and the composition contained therein and pass into a Geiger counter 41. This Geiger counter controls in known manner the delivery capacity of the pump 8 through its motor 7 and preferably also controls, by way of the motor 12, the speed of rotation of the shaft 13 powering the stirring mechanism 14 and the conveyor screw 18.

The evaporation and the action of the arms 20 of the stirring mechanism produce bubbles which break up the surface 24 of the liquid, and splashes of the composition can occur above the scrapers 33 which could be deposited in an undesirable manner on the interior wall of the reaction vessel. To prevent this, an anti-splash ring 42 is fitted on the upper edge of the base of the reaction vessel and on the angle part of the base ring 30. The ring 42 projects above the level of the liquid and the base ring. Furthermore, the scrapers 33 each include a part 33a which projects above the arms of the stirring mechanism towards the anti-splash ring 42 and engage the inside of the antisplash ring, thus serving as a stripping means while also preventing the composition from being deposited on this ring.

Figure 7:
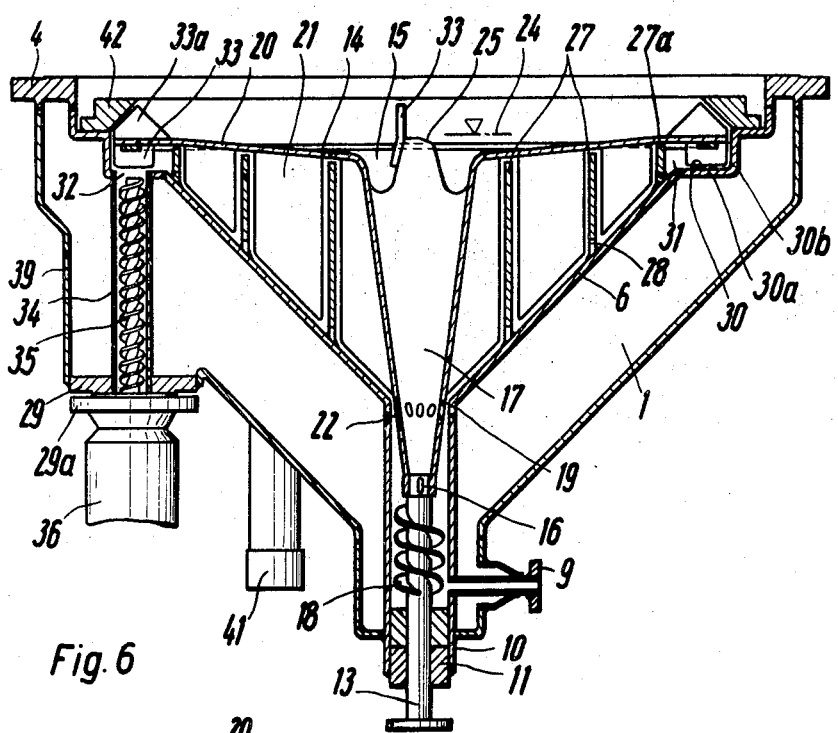
FIG. 7 is a vertical section through the lower part of a reaction vessel similar to that shown in FIG. 6, but wherein the frusto-conical part of the base of the vessel has a still more acute angle of taper than in FIG. 6 and the production chamber disposed above said base is intended to accommodate compositions of still lower viscosity, certain parts being omitted from this drawing.

In the case or reaction equipment for the vaporization treatment of compositions which, such as polyesters for example, become more viscous when evaporation occurs, it is advisable for evaporation to take place continuously in a plurality of stages. For this purpose, the reaction vessels in accordance wit the invention and of the above-described construction can be disposed in succession one after the other, the outlet 38 for the composition treated in a first reaction vessel being connected to the inlet 9 of the following vessel. Preferably, in this arrangement the angles of taper of the bases 6 of the later-stage reaction vessels are made increasingly greater, e.g., the first stage is as shown in FIG. 7, the next or following stage is as shown in FIG. 6 and the following or final stage is as shown in FIG. 1.

It will be appreciated that the reaction vessel of the present invention has many applications and is not in any way restricted for use for condensation reactions. It can be used, for example, in the production of many polymers, for example polyamides, e.g., nylon 6, and, especially in any chemical reaction or treatment where highly viscous masses are being treated. The reaction vessel is especially efficient in dealing with materials at viscosities in the range of from 5,000 to 12,000 poises, especially from 10,000 to 12,000 poises.

What is claimed is:

1. A reaction vessel for chemical and physical reactions of highly viscous masses, said reaction vessel comprising a vertical container of annular cross-section having a substantially frusto-conical downwardly tapering base, a driven stirring mechanism in said container and including a vertical shaft coaxially mounted in the base, substantially radially extending stirring arms on said shaft, and substantially axially extending, depending stirring blades attached to the arms and submerged below the surface of a highly viscous mass continuously supplied into the reaction vessel near the center of its base and having a level continuously and automatically adjusted to a predetermined position, said stirring arms and the stirring blades attached thereto being substantially entirely located in a production chamber defined in the frusto-conical base of the vertical container, said stirring blades extending from the vicinity of the level of the mass in proximity to said frusto-conical base, said stirring blades being spaced along said arms to provide spaces between radially adjacent blades over their entire height between adjacent blades over their entire height, ring-shaped dividing walls upstanding from said base and extending concentrically with the shaft of the stirring mechanism and passing through said spaces between said blades, said walls being rigidly attached to the base of the reaction vessel and having openings therethrough near the base which serve as restriction means for the centrifugally displaced mass constrained to flow radially through said openings, said base having a peripheral chamber formed by an outer bottom ring in the vicinity of the periphery of the production chamber, said outer bottom ring having at least one bottom opening, a discharge worm conveyor directly attached to said outer bottom ring at said bottom opening for discharging treated mass, said stirring arms including scrapers extending into the bottom ring chamber, and a further ring-shaped dividing wall between said scrapers and the outermost stirring blades, said further dividing wall being concentric with the other dividing walls and rigidly attached to the base of the container to serve as an overflow for the discharged mass into the bottom ring chamber.

2. A reaction vessel according to claim 1, wherein all the dividing walls extend from the base of the container axially to a position proximate the stirring arms.

3. A reaction vessel according to claim 1, wherein the container is provided with a closed vapor chamber above the production chamber containing the mass to be treated, said vapor chamber being provided with a vapor outlet adapted for connection to a vacuum source.

4. A reaction vessel according to claim 1, wherein the base of the container comprises a double wall jacket for conducting a heat transfer medium at least in its bottom part.

5. A reaction vessel according to claim 1, wherein said scrapers each include a lower portion inclined rearwardly at an acute angle with respect to its direction of rotation.

6. A reaction vessel according to claim 1, wherein the scrapers extend close to the bottom of said bottom ring at least over the major portion of its cross-section.

7. A reaction vessel according to claim 1, comprising a protective ring attached to said bottom ring at an outer edge thereof and extending upwardly to a level above the surface of the mass, said scrapers contacting the inner surface of the protective ring to clean the same.

8. A reaction vessel according to claim 1, wherein said stirring arms have upper ends inclined downwardly and forwardly in their direction of rotation.

9. A reaction vessel according to claim 1, comprising an input pipe extending to a central opening provided in said base for supply of the mass.

10. A reaction vessel according to claim 1, comprising an input pipe extending to a central opening provided in said base and a worm conveyor in said input pipe for transport of mass to be treated into said container.

11. An assembly of a plurality of reaction vessels according to claim 1 connected in succession for multistage continuous evaporation of masses with increasing viscosity during the treatment.

12. A reaction vessel according to claim 1, wherein said base has an angle of taper not greater than 90° for masses with a viscosity of up to 300 poise and an obtuse angle for masses with higher viscosity.

13. A reaction equipment according to claim 12, wherein the bases of the successive reaction vessels have cone angles which increase from one stage to the next.

* * * * *